3,595,789
GREASE RESISTANT TO OIL SEPARATION AT ELEVATED TEMPERATURE
Henry Selden Coshburn, Jr., New York, N.Y., assignor to Mobil Oil Corporation
No Drawing. Filed Dec. 16, 1968, Ser. No. 784,186
Int. Cl. C10m 5/20, 5/16, 7/25
U.S. Cl. 252—28     10 Claims

ABSTRACT OF THE DISCLOSURE

Greases substantially resistant to oil separation at elevated temperature are formed by preparing a grease composition containing a complex soap or a clay gelling agent and then mixing with the grease a minor amount of a polyisobutylene, a polystyrene, or a methacrylate copolymer, without substantial shearing of the polymer.

---

This invention has to do with grease compositions and with a process for preparing the same. More particularly, the invention relates to grease compositions which are not prone to the separation of oil therefrom when used at ambient and at elevated temperatures.

As is well known in the art, grease compositions comprising a lubricating oil vehicle and one or more gelling agents may suffer from a tendency to have the oil vehicle separate therefrom in storage or in use. Generally, by virtue of processing techniques and/or incorporation of certain additives in the greases, it has been possible to reduce this instability phenomenon with respect to ambient temperatures or even temperatures up to about 200–250° F. However, greases now available tend to have oil separate when the greases are subjected to elevated temperatures above about 350° F., and particularly at about 425° F. for about two hours.

For example, in the automotive industry, it has been found to be more advantageous during assembly of a vehicle to apply a grease to metal parts such as door hinges, window mechanisms, and deck and hood torsion bars before an assembled vehicle is sprayed with paint and the paint baked thereon, rather than following assembly and the baking operation. One difficulty in following the preferred operation is the tendency of the oil to separate or bleed from the grease as the paint is baked on the vehicle at about 350° F. for about 15–30 minutes. There is, therefore, a need for a grease resistant to such oil separation to meet this requirement of the automotive industry.

In accordance with the present invention, there are provided grease compositions substantially resistant to oil separation at ambient and at elevated temperatures. The new grease compositions are prepared by (a) forming a grease composition comprising a lubricating oil vehicle and a grease-forming quantity of a gelling agent selected from the group consisting of
  (1) an alkaline earth metal salt-alkaline earth metal soap complex, and
  (2) an organophilic clay, and
(b) mixing into the grease composition of (a) from about 0.1 to about 10 percent by weight thereof of a polymer selected from the group consisting of
  (i) a polyisobutylene having a molecular weight from about 2500 to about 25,000.
  (ii) a polystyrene having a molecular weight from about 2500 to 25,000, and
  (iii) a copolymer of alkyl esters of methacrylic acid having an average molecular weight of from about 500,000 to about 4,000,000, without substantially shearing of the polymer.

The gelling or thickening agents of the grease compositions are alkaline earth metal salt and salt-soap complexes including: calcium stearate-acetate (U.S. Patent No. 2,179,263); barium stearate-acetate (2,564,561); calcium stearate-caprylate-acetate (2,999,065); calcium caprylate-acetate (2,999,066); and preferably calcium and lead salts and soaps of a variety of acids (2,898,297).

Other gelling or thickening agents contemplated herein are essentially hydrophobic clays. Such thickening agents can be prepared from clays which are initially hydrophilic in character, but which have been converted into a hydrophobic condition by the introduction of long chain hydrocarbon radicals into the surface of the clay particles, prior to their use as a component of a grease composition, as, for example, by being subjected to a preliminary treatment with an organic cationic surface active agent, such as an onium compound. For example, a bentonite clay can be so converted to an organophilic bentonite.

This method of conversion, being well known to those skilled in the art, is believed to require no further discussion, and does not form a part of the present invention. More specifically, the clays which are useful as starting materials in forming the thickening agents to be employed in the grease compositions, can comprise the naturally occurring chemically unmodified clays. These clays are crystalline complex silicates, the exact composition of which is not subject to precise description, since they vary widely from one natural source to another. These clays can be described as complex inorganic silicates such as aluminum silicates, magnesium silicates, barium silicates, and the like, containing, in addition to the silicate lattice, varying amounts of cation-exchangeable groups generally regarded as metallic oxide radicals. Hydrophilic clays which are particularly useful for conversion to desired thickening agents include montmorillonite clays, such as bentonite, attapulgite, hectorite, illite, saponite, sepiolite, biotite, vermiculite, zeolite clays, and the like.

The thickening agent is employed in an amount from about 0.5 to about 30, and preferably from 3 percent to 15, percent by weight of the total grease composition.

The lubricating vehicles employed in the grease compositions can comprise any of the conventional oils of lubricating viscosity including mineral or synthetic lubricating oils, aliphatic phosphates, esters and diesters, silicates, siloxanes and oxalkyl ethers and esters. Mineral lubricating oils can be of any suitable lubricating viscosity ranging from about 45 SSU to 100° F., to about 2000 SSU at 100° F. and preferably from about 50 to about 250 SSU at 210° F. These oils may have viscosity indexes, varying from below 0 to about 100 or higher. Viscosity indexes from about 70 to about 95 are preferred. The average molecular weights of these oils range from about 250 to about 800. Other hydrocarbon oils include synthetic hydrocarbon polymers having improved viscosity index and being prepared by polymerizing an olefin, or mixtures of olefins, having from 5 to 18 carbon atoms per molecule in the presence of an aliphatic halide and a Ziegler-type catalyst.

Synthetic vehicles suitable herein include: polypropylene, polypropylene glycol, trimethylol propane esters, neopentyl and pentaerythritol esters, di-(2-ethylhexyl) sebacate, di-(2-ethylhexyl)adipate and related adipates, dibutyl phthalate, polyethylene glycol di-(2-ethyl hexoate), fluorocarbons, silicate esters, silanes, esters of phosphorus-containing acids, liquid ureas, ferrocene derivatives, chain type polyphenols, siloxanes and silicones (polysiloxanes), alkyl-substituted diphenyl ethers typified by a butyl-substituted bis-(p-phenoxy phenyl) ether, and phenoxy phenyl ethers.

Outstanding in conjunction with the inorganic clay-type thickeners identified above are synthetic ester lubricants, particularly esters of adipic acid and isooctyl and isodecyl alcohols.

When inorganic clay-type thickeners are used, it is generally advantageous to include a stabilizing agent such as pentaerythritol.

The polymers used in the grease compositions of this invention include: (i) polyisobutylenes having an average molecular weight from about 2,500 to about 25,000; (ii) polystyrenes having an average molecular weight from about 2,500 to about 25,000; and (iii) copolymers of alkyl esters of methacrylic acid having an average molecular weight of from about 500,000 to about 4,000,000.

Particularly advantageous are a polyisobutylene (i) having a nominal average molecular weight range of about 10,000–11,000, and a polystyrene (ii) having an average molecular weight of about 6000.

The copolymers (iii) include copolymers of alkyl esters of methacrylic acid with an average alkyl chain length of 8 to 10 carbons and an average molecular weight of 500,000 to 1,000,000; and copolymers of from 5 to 30 percent by weight of an N-vinyl pyrrolidone containing not over 10 carbon atoms in all and having the formula

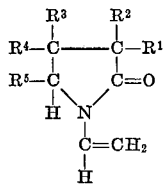

wherein $R^1$–$R^5$ is each selected from the class consisting of hydrogen and alkyl groups of not over four carbon atoms, and an alkyl methacrylate wherein the alkyl group has at least eight carbon atoms. Typical copolymers are described in U.S. Pats. Nos. 3,142,664 and 3,147,222.

The polymeric materials are used in amounts of from about 0.1 to about 10, and preferably 2 to 4, percent by weight of the total grease composition.

Grease bases used in forming the desired grease compositions (i.e. including a polymeric material), can be prepared in accordance with conventional manufacturing procedures for forming complex soap and clay greases. However, the incorporation of the polymeric material into a grease is critical. The polymeric material is added rapidly to a grease at a temperature between about 100° F. and about 300° F., preferably 160–200° F., and the resulting product is stirred or paddled slowly for a relatively short interval as from about 10 to about 60 minutes. To be avoided is rigorous agitation or homogenization when the polymeric material is together with the grease base. It has been found, as illustrated by test data hereinbelow, that severe shearing of the product reduces the value of the polymeric material so that the oil release characteristics of the product are substantially the same as those of the grease base. Thus, if the grease base is subjected to homogenization, as in a Manton Gaulin Homogenizer, the polymeric material must be incorporated therein following homogenization and under the conditions just described.

The grease compositions of this invention are illustrated in the several following examples.

One base grease (Grease A) was a calcium-lead complex prepared from the following components:

|  | Percent by weight |
| --- | --- |
| Naphthenic bright stock, 4500 sec. SUS/100° F. | 23.16 |
| Black oil, 6400 sec. SUS/100° F. | 0.05 |
| Solvent refined naphthenic neutral oil, 520 sec. SUS/100° F. | 56.83 |
| Caprylic acid | 1.83 |
| Sodium nitrite concentrate (25% wt. NaNO$_2$, balance hydrophobic clay and oil) | 0.80 |
| Coconut oil | 4.61 |
| Rust inhibitor A | 0.30 |
| Lime | 3.94 |
| Litharge | 1.09 |
| Acetic acid (Glacial) | 3.03 |
| Mixture of octyl-substituted diphenyl amines | 0.40 |
| Titanium dioxide | 0.02 |
| Ditertiary-butyl-paracresol | 0.40 |
| Chlorinated paraffin | 1.00 |
| Hydrogenated tallow fatty acids | 1.54 |

The sodium nitrite concentrate is described in detail in U.S. Pat. No. 3,227,651.

The chlorinated paraffin contains about 40 percent by weight of chlorine.

Rust Inhibitor A is an amic acid of glycine reacted with tetrapropenyl succinic anhydride, described in detail in Pat. No. 3,039,861.

The mixture of octyl-substituted diphenyl amines is marketed as Vanlube SL by the R. T. Vanderbilt Co.

Approximately three-quarters of the naphthenic neutral oil, substantially all of the lime and the litharge, hydrogenated tallow fatty acids, caprylic acid, coconut oil, water (approximately equal to the quantity of the tallow fatty acids), and acetic acid, are charged to a Stratco Contactor, and are heated therein for about one hour until the temperature rises to about 350° F. and the pressure is about 110 pounds per square inch (p.s.i.g.). The Contactor is vented to decrease the pressure to about 40 p.s.i.g. and the materials are blown over into an open grease kettle which has been preheated to about 300° F. The materials are paddled in the kettle. Then, the remainder of the lime and the titanium oxide are added. The kettle is heated and the contents are paddled to dehydrate the contents, during an interval of about 30 minutes at about 315° F.

About three-fourths of the naphthenic bright stock is heated in the Contactor to about 300° F. and is then transferred to the open kettle. The resulting product, then cooled to about 250° F., is passed through a Manton Gaulin Homogenizer at 3000 p.s.i.g. About 10 percent of the naphthenic bright stock is then added and the product is circulated through the homogenizer at 3000 p.s.i.g. for about 1½ hours. When the temperature is about 200° F., the substituted diphenyl amine mixture, substituted paracresol, sodium nitrite concentrate, Rust Inhibitor A and chlorinated paraffin are added. The black oil is added. The temperature is decreased to about 140° F. and the balance of the naphthenic neutral oil and of the naphthenic bright stock are added. The resulting grease is then passed through the homogenizer and a filter.

The clay base grease (Grease B) was formed from the following materials:

|  | Percent by weight |
| --- | --- |
| Ammonium dimethyldibenzyl bentonite clay | 7.50 |
| Pentaerythritol | 0.55 |
| Bright stock, 150 sec. SUS/100° F. | 90.45 |
| Rust Inhibitor A | 1.00 |
| Vanlube SL | 0.50 |

Approximately two-thirds of the bright stock is charged to an open grease kettle and heated therein to about 190° F. The clay is added to the heated oil. The pentaerythritol is dissolved in water (4 parts by weight of water for each part of pentaerythritol) by heating the same to about 180° F. The resulting aqueous solution is added to the clay and oil in the kettle maintained at 190° F. The resulting grease mixture is passed through a Manton Gaulin homogenizer operated at 3500 p.s.i.g. The grease is heated to 205° F. and is homogenized at this temperature for about 80 minutes. The grease is then heated to about 235° F. during another time interval of about 80 minutes. The grease becomes clear as dehydration is essentially completed.

Approximately ten percent of the bright stock, substantially all of Rust Inhibitor A and of Vanlube SL are then added to the grease. The temperature of the grease is about 205° F. following addition of the bright stock and additives. The grease is then paddled and circulated through the homogenizer operate at 3500 p.s.i.g. for 30 minutes. The balance of the bright stock and additives are then added, and the resulting grease is discharged from the kettle by passing through the homogenizer at 3500 p.s.i.g. and a filter.

Another clay base grease (Grease C) was formed from the following materials:

|  | Percent by weight |
|---|---|
| Ammonium dimethyldibenzyl bentonite clay | 5.4 |
| Pentaerythritol | 0.7 |
| Bright stock, 155 sec. SUS/100° F. | 55.4 |
| Coastal oil, 60 sec. SUS/100° F. | 37.0 |
| Rust Inhibitor B | 1.0 |
| Vanlube AZ | 0.5 |

Rust Inhibitor B is a phosphite ester of an alkylated phenol, marketed by Monsanto as Santolube 31.

Vanlube AZ is zinc diamyl dithiocarbamate, marketed by R. C. Vanderbilt Co.

Approximately one-half of the bright stock and two-thirds of the Coastal oil are charged to a grease kettle. The clay is then charged slowly to the kettle. The pentaerythritol is dissolved in water (1:4 parts by weight) by heating the mixture to 180° F. The resulting clay-oil slurry is heated to about 190° F. and the hot aqueous pentaerythritol solution is added to the slurry. The resulting grease mixture is homogenized by passing it through the homogenizer operated at 1200 p.s.i.g. The grease is heated to about 235° F. as it is homogenized. Here too, the grease becomes clear as dehydration is complete. The temperature of the grease is decreased to about 205° F. The balance of the bright stock and of the Coastal oil, Rust Inhibitor A and Vanlube AZ are added. The resulting grease is paddled and circulated through the homogenizer for about 30 minutes.

EXAMPLE 1

To 100 parts of Grease A at 160–190° F. in a grease kettle with a homogenizer joined thereto, 4 parts of polystyrene (Piccolastic E–125) at 150° F. were added rapidly. The resulting grease product was paddled slowly at a paddle speed of about 7–15 r.p.m., for about 30 minutes. The resulting grease was then discharged from the kettle through the homogenizer at 0 p.s.i.g. Thus, the homogenizer did not serve to shear the product.

EXAMPLE 2

The procedure of Example 1 was followed except that another batch of the calcium-lead complex base grease (Grease $A_1$) prepared by the procedure described above, was employed.

EXAMPLE 3

The procedure of Example 1 was followed except that 2 parts of a methacrylate copolymer, Acryloid 622, heated to about 140° F., were so added to another batch of the calcium-lead soap complex base grease (Grease $A_2$) prepared by the procedure given above.

EXAMPLE 4

The procedure of Example 3 was followed except for the use of 2 parts om methacrylate copolymer, Acryloid 710, in place of Acryloid 622.

EXAMPLE 5

The procedure of Example 3 was followed except for the use of 2 parts of methacrylate copolymer, Acryloid 772, in place of Acryloid 622.

EXAMPLE 6

The procedure of Example 3 was followed except for the use of 2 parts of methacrylate copolymer, Acryloid 909, in place of Acryloid 622.

COMPARATIVE EXAMPLE I

Another batch of the calcium-lead soap base grease (Grease $A_3$) was selected and subjected to the test described below. Compared with the base grease was a product prepared by adding 4 parts of polyisobutylene (Paratone 108), at 140° F., to 100 parts of Grease $A_3$ at 180° F. in a grease kettle. The resulting product was homogenized for 30 minutes in a Manton Gaulin Homogenizer operated at 2,000 pounds per square inch.

EXAMPLE 7

To 100 parts of Grease B at 180° F. in the kettle described in Example 1, 3 parts of polyisobutylene (Paratone 108) were added rapidly at 140° F. The resulting grease product was paddled and removed from the kettle, as described in Example 1.

EXAMPLE 8

The procedure of Example 7 was followed except for the use of 4 parts of Acryloid 622 in place of the polyisobutylene, in another batch of the clay base grease (Grease $B_1$).

EXAMPLE 9

The procedure of Example 8 was followed except that another batch of the clay base grease (Grease $B_2$), was used.

EXAMPLE 10

The procedure of Example 7 was followed except for the use of 4 parts of Piccolastic E–125 in place of polyisobutylene in another batch of the clay base grease (Grease $B_3$).

EXAMPLE 11

(a) To 100 parts of Grease C at 310° F. in a grease kettle, 4 parts of Acryloid 622 at 135° F. were added rapidly. The resulting grease product was paddled slowly at a paddle speed of about 7–15 r.p.m. for about 15 minutes as in Example 1.

(b) The procedure of (a) was repeated except that the product was so paddled for about 30 minutes.

EXAMPLE 12

(a) Another batch of the clay base grease (Grease $C_1$) was employed. Acryloid 622, 4 parts, at 135° F. was added rapidly to the grease at 105° F. The resulting grease product was paddled for about 15 minutes as described in Example 1.

(b) The procedure of (a) was repeated. In this instance, the grease product was paddled for about 30 minutes.

The base greases, grease compositions of Examples 1–12 and of Comparative Example I, were subjected to a Chrysler Corporation test for evaluating oil separation and evaporation characteristics of lubricating greases (Laboratory Procedure No. 461C–119). A pressure bleeding test cell (Labline Catalog No. 4170) and a beaker for collecting oil are thoroughly cleaned with naphtha and are dried with air. The cell includes a cup, strainer, funnel and cover. The oil-collecting beaker and the strainer are weighed. The strainer is filled with a test grease and is then placed into the cup on top of the funnel and the cover is installed on the cell. The test cell is then placed in an oven and is maintained at about 425° F. for two hours. The test cell is removed from the oven and is allowed to cool to room temperature (about 70° F.). The cover and strainer are removed from the cell. The strainer is weighed to determine the amount of oil lost from the grease. The oil collecting beaker is weighed to determine the amount of oil separation.

Results of the tests are provided in Table I below.

TABLE I

| | Polymer | Wt. Percent | Oil separation |
|---|---|---|---|
| Grease A | | | 2.1 |
| Example 1 | Polystyrene | 3 | 1.2 |
| Grease A₁ | | | 4.4 |
| Example 2 | Polystyrene | 3 | 2.3 |
| Grease A₂ | | | 3.4 |
| Example 3 | Methacrylate (622) | 2 | 0.9 |
| Example 4 | Methacrylate (710) | 2 | 2.1 |
| Example 5 | Methacrylate (772) | 2 | 2.1 |
| Example 6 | Methacrylate (909) | 2 | 1.6 |
| Comparative Example I: | | | |
| Grease A₃ | | | 4.3 |
| Do | | 4 | 4.5 |
| Grease B | | | 2.6 |
| Example 7 | Polyisobutylene | 3 | 2.1 |
| Grease B₁ | | | 3.4 |
| Example 8 | Methacrylate (622) | 4 | 1.9 |
| Grease B₂ | | | 2.9 |
| Example 9 | Methacrylate (622) | 4 | 1.8 |
| Grease B₃ | | | 7.9 |
| Example 10 | Polystyrene | 4 | 3.4 |
| Grease C | | | 6.2 |
| Example 11a | Methacrylate (622) | 4 | 5.1 |
| Example 11b | do | 4 | 5.3 |
| Grease C₁ | | | 5.4 |
| Example 12a | Methacrylate (622) | 4 | 4.4 |
| Example 12b | do | 4 | 4.6 |

As shown in the tabulated data, improvement is realized with each of the polymers in the several base greases except for the grease of Comparative Example I wherein excessive shear was used during blending of the polymer with the base grease. With Grease C and Grease C₁ employed, Examples 11 and 12 reveal that products characterized by better oil separation characteristics are provided by paddling for about 15 minutes rather than for a longer time interval of about 30 minutes. Comparable results are obtained by adding the polymer while the base grease is at a temperature of about 105° F. (12a, b) and at about 310° F. (11a, b).

"Piccolastic E-125" is marketed by the Pennsylvania Industrial Chemical Corparation. It is polystyrene resin having an estimated molecular weight of about 6000. It is barely mobile at 150° C. and has the following additional characteristics:

| | |
|---|---|
| Melting point, Ball & Ring, ° C. | 125 |
| Specific gravity | 1.06 |
| Density, lb./gal. at 60° F. | 7.54 |
| Refractive index at 25° C. | 1.60 |
| Acid No. | 1.0 |
| Saponification No. | 1.0 |
| Iodine No. (calculated) | 2 |
| Flash point (C.O.C.), ° F. | 535 |
| Fire point (S.O.C.), ° F. | 590 |

"Paratone 108" is marketed by the Enjay Company. It comprises 33–38 percent by volume of a polyisobutylene having a nominal average molecular weight of 10,000–11,000, and 67–62 percent by volume of a solvent 150 second neutral base oil. It is a pale, highly viscous liquid having the following characteristics:

| | |
|---|---|
| Viscosity at 210° F., cs. | 650 |
| Shear breakdown, percent sonic | 12 |
| Specific gravity, 60/60° F. | 0.875 |
| Density, lb./gal. at 60° F. | 7.3 |
| Flash point (C.O.C.), ° F. | 400 |

The acryloids are marketed by Rohm & Haas Company. Acryloid 622 and 615 have the same polymer composition, but 615 has a higher polymer content and the polymer is lower in molecular weight than is 622. The latter is described as a clear, viscous concentrate of methacylate copolymer in a solvent refined 100 S.U.S. at 100° F. neutral oil. Properties of the two copolymers are as follows:

| | 622 | 615 |
|---|---|---|
| Specific gravity, 60° F./60° F. | 0.898 | 0.900 |
| Density, lb./gal. at 60° F. | 7.47 | 7.49 |
| Viscosity, ASTM D-445: | | |
| Cst./210° F. | 1,175 | 1,150 |
| SUS/210° F. | 5,500 | 5,400 |
| Cst/100° F. | 30,000 | 40,000 |
| SUS/100° F. | 139,000 | 186,000 |
| Neutralization No., ASTM D-974 | 0.2 | 0.3 |

"Acryloid 710" is a clear viscous concentrate of methacrylate copolymer in a solvent refined (150 SUS/100° F.) neutral oil. It has the following properties:

| | |
|---|---|
| Specific gravity, 60° F./60° F. | 0.906 |
| Density, lb./gal. at 60° F. | 7.54 |
| Viscosity, ASTM D-445: | |
| Cst./210° F. | 800 |
| SUS/210° F. | 3700 |
| Cst./210° F. | 9400 |
| SUS/210° F. | 430,000 |
| Neutralization No., ASTM D-974 | 0.3 |
| Pour point, ° F. (ASTM viscosity pour point) | +25 |

"Acryloid 909" is a slightly hazy to hazy, viscous concentrate of methacrylate copolymer in solvent refined neutral oil. It has the following physical properties:

| | |
|---|---|
| Specific gravity, 60° F./60° F. | 0.909 |
| Density, pounds/gallon at 60° F. | 7.57 |
| Viscosity, ASTM D-445: | |
| Cst./210° F. | 875 |
| SUS/210° F. | 4,080 |
| Cst./100° F. | 12,000 |
| SUS/100° F. | 55,000 |
| Neutralization number, ASTM D-974 | 0.3 |
| Pour point, ° F. (ASTM viscosity pour point) | +25 |

Other improving agents can also be included in the grease compositions of this invention, in order to obtain the benefit of their known characterizing features. Antioxidants can be used such as amines, of which phenyl alpha naphthylamine (PAN) is preferred, and phenols of which 2,6-di-tertiary butyl 4-methyl phenol is preferred. Lubricity improving agents such as free fat, free fatty acids, sulfurized fats, lead soaps and esters of alkyl and/or aryl acids can be used. Antioxidants such as sodium nitrate are also useful in the new compositions.

In addition to their utility as greases in the assembly of automotive vehicles, the new greases are suitable for a wide range of industrial applications. Some, for example, are suitable for use in multi-purpose automotive greases, serving as chassis, wheel-bearing, water-pump grease lubricants. Others are multi-purpose industrial greases serving as plain-bearing and anti-friction greases for heavily loaded equipment.

What is claimed is:

1. The process for preparing a grease composition substantially resistant to oil separation at elevated temperature, which comprises:
   (a) forming a grease composition comprising a lubricating oil vehicle and a grease-forming quantity of a gelling agent selected from the group consisting of
      (1) an alkaline earth metal salt-alkaline earth metal soap complex, and
      (2) an organophilic clay, and
   (b) mixing into the grease composition of (a), at about 100° F. to 300° F., from about 0.1 to about 10 percent by weight thereof of a polymer selected from the group consisting of
      (i) a polyisobutylene having a molecular weight from about 2,500 to about 25,000,
      (ii) a polystyrene having a molecular weight from about 2,500 to about 25,000, and
      (iii) a copolymer of alkyl esters of methacrylic acid having an average molecular weight of from about 500,000 to about 4,000,000,
   without substantially shearing the polymer.

2. The process of claim 1 wherein the grease gelling agent (1) is a calcium salt-calcium soap complex.

3. The process of claim 1 wherein the grease gelling agent is a complex of calcium and lead salts and soaps.

4. The process of claim 1 wherein the grease gelling agent (2) is an organophilic bentonite.

5. The process of claim 1 wherein the polymer (i) is a polyisobutylene having a molecular weight of about 10,000.

6. The process of claim 1 wherein the polymer (ii) is a polystyrene having a molecular weight of about 6000.

7. The process of claim 1 wherein the polymer (iii) is a copolymer of alkyl esters of methacrylic acid with an average alkyl chain length of 8 to 10 carbon atoms and an average molecular weight of 500,000 to 1,000,000.

8. The process of claim 1 wherein the polymer (iii) is a copolymer of from 5 to 30 percent by weight of a N-vinyl pyrrolidone containing not over 10 carbon atoms in all and having the formula

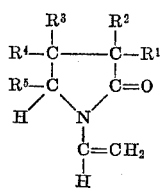

wherein $R^1$–$R^5$ is each selected from the class consisting of hydrogen and alkyl groups of not over four carbon atoms, and an alkyl methacrylate wherein the alkyl group has at least eight carbon atoms.

9. The process of claim 1 wherein from about 2 to about 4 percent by weight of the polymer is so mixed in (b).

10. A grease composition prepared by the method of claim 1.

References Cited

UNITED STATES PATENTS

| | | | |
|---|---|---|---|
| 2,084,500 | 6/1937 | Otto et al. | 252—40 |
| 2,737,494 | 3/1956 | Frank et al. | 252—39 |
| 3,083,160 | 3/1963 | Agius et al. | 252—59 |
| 3,123,563 | 3/1964 | Verley | 252—39 |
| 3,131,119 | 4/1964 | Fordyce et al. | 252—51.5A |
| 3,142,664 | 7/1964 | Bauer | 252—51.5A |
| 3,147,222 | 9/1964 | Bauer | 252—51.5A |
| 3,211,650 | 10/1965 | Oswalt | 252—39 |
| 3,271,311 | 9/1966 | Morway et al | 252—59 |
| 3,290,244 | 12/1966 | Polishuk et al. | 252—28 |
| 3,412,027 | 11/1968 | Morway | 252—59 |

DANIEL E. WYMAN, Primary Examiner

I. VAUGHN, Assistant Examiner

U.S. Cl. X.R.

252—36, 39, 40.5, 40.7, 56R, 51.5A, 59

PO-1050
(5/69)

UNITED STATES PATENT OFFICE
CERTIFICATE OF CORRECTION

Patent No. 3,595,789      Dated July 27, 1971

Inventor(s) HENRY SELDEN COSHBURN, JR.

It is certified that error appears in the above-identified patent and that said Letters Patent are hereby corrected as shown below:

Column 1, line 67, after "to" insert --about--.

Column 2, line 4, "2,179,263" should read --2,197,263--.

Column 2, line 48, "to" should read --at--.

Column 5, line 4, "operate" should read --operated--.

Column 5, line 64, "om" should read --of--.

Column 7, line 40, "Corparation" should read --Corporation--.

Column 7, line 53, "(S.O.C.)" should read --(C.O.C.)--.

Column 7, line 73, "methacylate" should read --methacrylate--.

Signed and sealed this 28th day of December 1971.

(SEAL)
Attest:

EDWARD M. FLETCHER, JR.      ROBERT GOTTSCHALK
Attesting Officer      Acting Commissioner of Patents